Aug. 19, 1924.  
C. HILMERSON  
LUMBER GAUGE  
Filed May 31, 1922
1,505,264
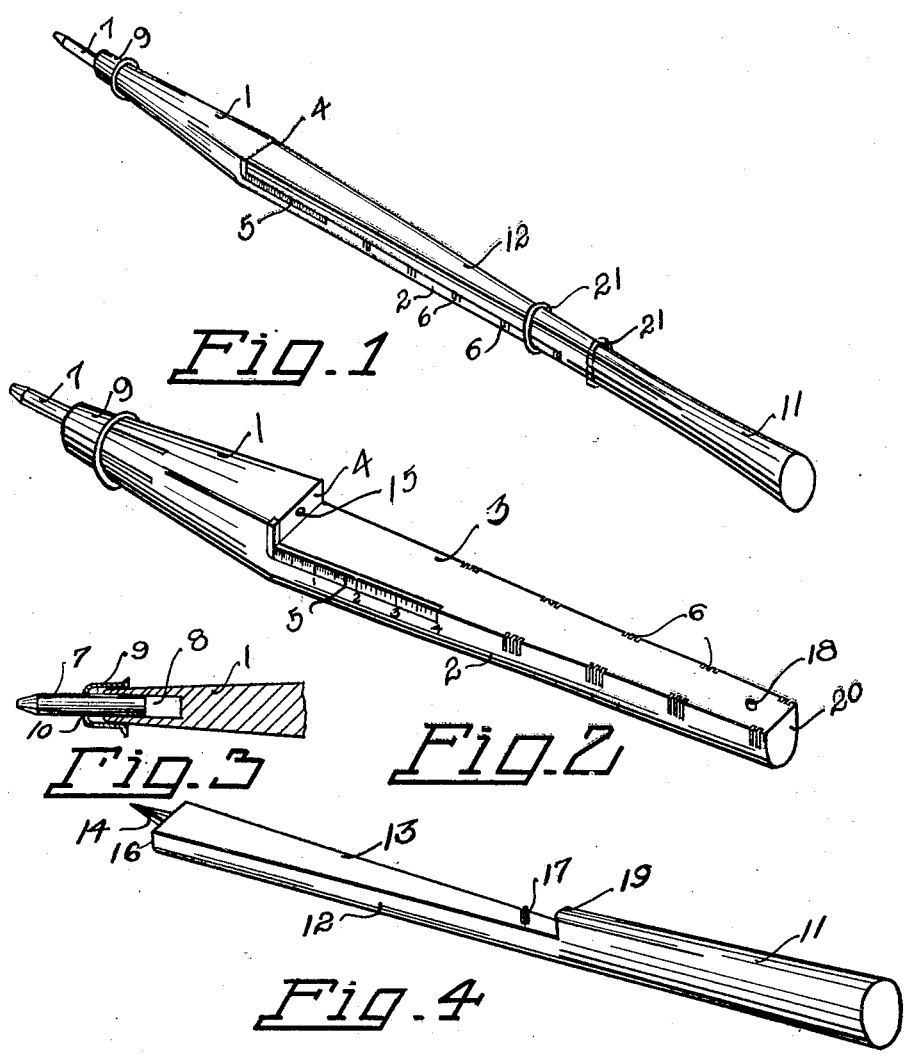
Inventor  
Carl. Hilmerson  
By Herbert E. Smith  
Attorney Patented Aug. 19, 1924.

1,505,264

UNITED STATES PATENT OFFICE.

CARL HILMERSON, OF SPOKANE, WASHINGTON.

LUMBER GAUGE.

Application filed May 31, 1922. Serial No. 564,766.

*To all whom it may concern:*

Be it known that I, CARL HILMERSON, a citizen of the United States, residing at Spokane, in Spokane County and State of Washington, have invented certain new and useful Improvements in Lumber Gauges, of which the following is a specification.

My present invention relates to improvements in lumber gauges and also embodies a marking instrument to form a combination gauge and marker adapted especially for facility in measuring, grading and marking lumber or timber.

The primary object of the invention is the provision of a comparatively inexpensive but accurate measuring instrument, which may be manipulated with facility by the lumber grader in his work of measuring, grading and marking the lumber as it comes from the saw mills, as well as in grading the material in piles.

With these ends in view the invention consists in certain novel features of construction and combinations and arrangements of parts in a separable tool whereby provision is made for protecting the measuring portion of the instrument when not in use, as well as for providing a facile marking device, as will be hereinafter more fully pointed out and claimed.

In the accompanying drawings I have illustrated one complete example of the physical embodiment of my invention wherein the parts are combined and arranged according to the best mode I have thus far devised for the practical application of the principles of my invention.

Figure 1 is a perspective view of the instrument in position for use as a marker.

Figure 2 is a perspective view, enlarged, showing the instrument ready for gaging or measuring lumber, and also capable of use as a marker.

Figure 3 is a detail sectional view at the marking end of the instrument, showing the manner of securing the chalk, crayon, or other sharpened marker to the instrument.

Figure 4 is a perspective view of the handle portion of the instrument, detached.

In the preferred form of the invention as illustrated in the drawings, the gauge-bar 1 is of suitable wood and convenient size for its required functions, and fashioned with a body portion 2 integral therewith, but cut to different shape with a flat face 3, as shown in Figure 2. The body of the measuring gauge is semi-circular in cross section, and preferably tapers in both directions toward front and rear from the abrupt shoulder 4, which is squared with the flat face of the body of the gauge.

At the junction of the bar and body a metal wear plate 5 is inset into the wood, said plate being somewhat of an L-shape, and forming an angular scale plate with graduations in inches and fractions thereof, extending along one edge of the flattened body 2. The same scale in inches, is also continued along the edge of the flattened gauge body, by the utilization of groups of notches 6 for marking off two-inch spaces, thus providing a scale twelve inches long extending from the shoulder 4 to the end of the gauge body. The notches 6 are arranged in groups of three, of which the intermediate notch indicates a standard measurement and the two outer notches indicate an undersize and an oversize respectively by means of which the three grades of lumber may be determined.

At one end the instrument is provided with a pencil or marker 7, sharpened of course, and made up of crayon, chalk, or other suitable marking material. The marking point is renewable and adjustable, and is retained in its socket 8 in the end of the gauge bar by means of a metal cap or thimble 9 having an opening 10 for the pencil or chalk. The cap is preferably resilient and tapered in order that it may be shoved over the socket end of the bar and frictionally hold the pencil point or chalk in position for use.

The detachable handle 11 of the instrument is of convenient form and shape, and fashioned with an undercut portion 12 having a smooth or flat face 13 complementary to the flat face 3 of the gauge-bar. At one end the handle is provided with a sharpened pin or spike 14 adapted to be inserted in the hole 15 in the shoulder 4 of the gauge bar, and a pin 17 projecting from the flat face of the handle is adapted to project into a socket or hole 18 in the flat face of the gauge bar.

In Figure 1 it will be seen that the complementary members 2 and 12 are adapted to overlap with the end 16 and shoulder 4 in engagement, and the shoulder 19 and end 20 are also adapted to engage. Thus with the guide pins in their sockets holding the separable members against both longitudinal and lateral movement, a rubber metal or ring 21 may be slipped over one end of the instrument to retain the parts in position. By slipping the ring back to dotted position in Figure 1 the parts may readily be separated, and the gauge bar, as in Figure 2, is then ready for measurements. By hooking the shouldered bar (as at 4) over the edge of a plank or board, its dimensions may readily be ascertained by consulting the scale, then if desired the pointed marker may be withdrawn and the lumber marked; or the pointed marker may remain in its holder and the gauge bar used in manner similar to a pencil. It will also be quite evident that the instrument as shown in Figure 1 may be used in manner similar to a pencil for making required markings in grading the material, as No. 2 common, common, cull, &c. When using the marker as in Figure 1 the grader is enabled to stand erect and mark the characters or designations on the boards as they are taken from a pile, thus providing a convenient device for the purpose, and rendering the work of the grader less arduous.

Having thus fully described my invention, what I claim as new and desire to secure by Letters Patent is:—

1. A gauge bar having a cut out portion forming a flat face and a squared shoulder, an angular plate having a scale thereon and attached to said bar at the junction of the flat face and shoulder, and spaced groups of notches in the bar forming a continuation of said scale.

2. The combination in a lumber gauge of a bar having a shoulder and cut out portion forming a flat face, a scale including spaced notches along the edge of said face, a detachable handle portion forming a shield for said scale and provided with a complementary shoulder and flat face, complementary pins and sockets on said bar and handle portion, and a resilient retaining ring for said latter members.

In testimony whereof I affix my signature.

CARL HILMERSON.